(12) United States Patent
Gregorio et al.

(10) Patent No.: US 6,781,569 B1
(45) Date of Patent: Aug. 24, 2004

(54) HAND CONTROLLER

(75) Inventors: Pedro Gregorio, Verdun (CA); Vincent Hayward, Montreal (CA); Christophe Ramstein, Montreal (CA)

(73) Assignee: Immersion Corporation, San Jose, CA (US)

( * ) Notice: Subject to any disclaimer, the term of this patent is extended or adjusted under 35 U.S.C. 154(b) by 0 days.

(21) Appl. No.: 09/330,125

(22) Filed: Jun. 11, 1999

(51) Int. Cl.[7] ............................................... G06F 3/033
(52) U.S. Cl. ........................ 345/157; 345/158; 345/161; 345/156; 345/184
(58) Field of Search ................................ 345/157, 158, 345/156, 161, 184, 163, 326, 333; 341/20, 22

(56) References Cited

U.S. PATENT DOCUMENTS

| | | |
|---|---|---|
| 3,919,691 A | 11/1975 | Noll ........................ 340/172.5 |
| 4,604,016 A | 8/1986 | Joyce ............................. 414/7 |
| 4,775,289 A | 10/1988 | Kazerooni ................... 414/735 |
| 4,811,608 A | 3/1989 | Hilton ........................... 73/862 |
| 4,949,119 A | 8/1990 | Moncrief et al. ........... 364/578 |
| 4,962,448 A | 10/1990 | DeMaio et al. ............. 364/146 |
| 4,985,652 A | 1/1991 | Oudet et al. .................. 310/15 |
| 5,007,300 A | 4/1991 | Siva ....................... 74/471 XY |
| 5,044,956 A | 9/1991 | Behensky et al. ............ 434/45 |
| 5,065,145 A | 11/1991 | Purcell ........................ 340/706 |
| 5,107,080 A | 4/1992 | Rosen ........................ 200/6 A |
| 5,107,262 A | 4/1992 | Cadoz et al. .................. 341/22 |
| 5,142,931 A | 9/1992 | Menahem ............... 74/471 XY |
| 5,146,566 A | 9/1992 | Hollis, Jr. .................... 395/275 |
| 5,193,963 A | 3/1993 | McAffee et al. ............... 414/5 |
| 5,223,776 A | 6/1993 | Radke et al. ............ 318/568.1 |
| 5,231,998 A * | 8/1993 | Rosen et al. ................. 128/878 |
| 5,296,846 A | 3/1994 | Ledley ........................ 345/161 |
| 5,297,057 A | 3/1994 | Kramer et al. .............. 364/512 |
| 5,379,663 A * | 1/1995 | Hara ............................ 74/471 |

(List continued on next page.)

FOREIGN PATENT DOCUMENTS

| | | | |
|---|---|---|---|
| WO | WO94/26167 | | 11/1994 |
| WO | PCT/US94/10762 | * | 4/1995 |

OTHER PUBLICATIONS

Article: Oct. 22, 1994 issue, p. 267.*
Yokokohji, Y., et al., "What You Can See is What You Can Feel—Development of a Visual/Haptic Interface to Virtual Environment," IEEE Jan. 1996, pp. 46–54.

(List continued on next page.)

*Primary Examiner*—Richard Hjerpe
*Assistant Examiner*—Ali Zamani
(74) *Attorney, Agent, or Firm*—Kilpatrick Stockton LLP

(57) ABSTRACT

A hand controller arm assembly provides for the sensing of the position of a handle at the end of an arm in the X and Y direction through supporting linkages, and in the Z direction through a hinge which permits the arm to rotate upwardly. The joints of this controller may be actuated to provide haptic feed-back.

20 Claims, 16 Drawing Sheets

U.S. PATENT DOCUMENTS

| | | | |
|---|---|---|---|
| 5,397,323 A | 3/1995 | Taylor et al. | 606/130 |
| 5,414,337 A | 5/1995 | Schuler | 318/561 |
| 5,491,477 A | 2/1996 | Clark et al. | 341/20 |
| 5,559,432 A | 9/1996 | Logue | 324/207.17 |
| 5,587,937 A * | 12/1996 | Massie et al. | 364/578 |
| 5,589,854 A | 12/1996 | Tsai | 345/161 |
| 5,623,582 A | 4/1997 | Rosenberg | 395/99 |
| 5,625,576 A * | 4/1997 | Massie et al. | 364/578 |
| 5,642,469 A | 6/1997 | Hannaford | 395/99 |
| 5,643,087 A | 7/1997 | Marcus et al. | 463/38 |
| 5,694,013 A | 12/1997 | Stewart et al. | 318/561 |
| 5,701,140 A | 12/1997 | Rosenberg et al. | 345/156 |
| 5,709,219 A | 1/1998 | Chen et al. | 128/782 |
| 5,721,566 A | 2/1998 | Rosenberg et al. | 345/161 |
| 5,731,804 A | 3/1998 | Rosenberg | 345/156 |
| 5,734,373 A | 3/1998 | Rosenberg et al. | 345/161 |
| 5,742,278 A | 4/1998 | Chen | 345/156 |
| 5,767,839 A | 6/1998 | Rosenberg | 345/161 |
| 5,790,108 A | 8/1998 | Salcudean et al. | 345/184 |
| 5,805,140 A | 9/1998 | Rosenberg et al. | 345/161 |
| 5,816,105 A | 10/1998 | Adelstein | 74/471 XY |
| 5,825,308 A | 10/1998 | Rosenberg | 341/20 |
| 5,828,197 A | 10/1998 | Martin et al. | 318/567 |
| 5,847,528 A | 12/1998 | Hui et al. | 318/568.1 |
| 5,990,869 A | 11/1999 | Kubica et al. | 345/163 |
| 6,001,014 A | 12/1999 | Ogata et al. | 463/37 |
| 6,004,134 A | 12/1999 | Marcus et al. | 434/45 |
| 6,020,967 A * | 2/2000 | Gregorio et al. | 356/375 |
| 6,024,576 A | 2/2000 | Bevirt et al. | 434/262 |
| 6,100,874 A | 8/2000 | Schena et al. | 345/157 |
| 6,104,158 A | 8/2000 | Jacobus et al. | 318/568.11 |
| 6,104,379 A | 8/2000 | Petrich et al. | 345/157 |
| 6,104,382 A | 8/2000 | Martin et al. | 345/161 |
| 6,078,876 A * | 11/2000 | Rosenberg et al. | 702/152 |
| 6,147,674 A * | 11/2000 | Rosenberg et al. | 345/157 |
| 6,166,723 A | 12/2000 | Schena et al. | 345/184 |
| 6,195,592 B1 | 2/2001 | Schuler et al. | 700/83 |
| 6,300,937 B1 * | 10/2001 | Rosenberg | 345/156 |
| 6,310,605 B1 * | 10/2001 | Rosenberg et al. | 345/157 |

OTHER PUBLICATIONS

Howe, R. et al., "Task Performance with a Dextrous Teleoperated Hand System," Proceedings of SPIE, vol. 1833, Nov. 1992.

Millman, P. et al., "Design of a Four Degree-of-Freedom Force-Reflecting Manipulandum with a Specified Force/Torque Workspace," IEEE CH2969-4, 1991, pp. 1488-1492.

Kelley, A.J. et al., "MagicMouse: Tactile and Kinesthetic Feedback in the Human-Computer Interface using an Electromagnetically Actuated Input/Output Device," Dept. of Elec. Engineering, Univ. of British Columbia, 1993, pp. 1-27.

Adelstein, B. et al., "Design and Implementation of a Force Reflecting Manipulandum for Manual Control Research," Dept. of Mech. Engineering, MIT, 1992, pp. 1-24, table, figure.

Hannaford, B. et al., "Scaling of Direct Drive Robot Arms," Intl Journal of Robotics Research, 1996, pp. 1-47.

Schmult, Brian et al., "Application Areas for a Force-Feedback Joystick," ASME 1993, DSC-vol. 49, pp. 47-54.

Hayward, V. et al., "Design and Multi-Objective Optimization of a Linkage for a Haptic Interface," Advances in Robot Kinematics and Comutationed Geometry, 1994, pp. 359-368.

Ramstein, C et al., "The Pantograph: A Large Workspace Haptic Device for a Multimodal Human-Computer Interaction," Computer-Human Interaction, CHI '94, 1994, pp. 1-3.

Payette, J. et al., "Evaluation of a Force Feedback (Haptic) Computer Pointing Device in Zero Gravity," DSC-vol. 58, Proc. of ASME Dynamics Sys. and Control Division, ASME 1996, pp. 547-553.

Ramstein, C., "Combining Haptic and Braille Technologies: Design Issues and Pilot Study," ASSETS '96, ACM 0-89791-776-6/96/04, 1996, pp. 37-44.

Iwata, H., "Artificial Reality with Force-feedback: Development of Desktop Virtual Space with Compact Master Manipulator," Computer Graphics, vol. 24, No. 4, 1990, pp. 165-170.

Tavkhelidze, D.S., "Kinematic Analysis of Five-Link Spherical Mechanisms," Mechanism and Machine Theory, 1974, vol. 9, pp. 181-190.

Massie, T., "Design of a Three Degree of Freedom Force-Reflecting Haptic Interface," Dept. of Elec. Engineering and Comp. Sci., MIT, 1993, pp. 1-38.

Hasser, C., "Tactile Feedback for a Force-Reflecting Haptic Display", Univ. of Dayton, Dayton OH, 1995, pp. 1-96.

* cited by examiner

HAND CONTROLLER

FIELD OF THE INVENTION

This invention relates to the field of mechanical hand controllers. More particularly, in preferred embodiments the invention relates to a haptic device that provides sensory feed-back to a user, to a preferred form of rotary electrical actuation or "torquer" for activating the controller, and to a user input system suited to haptic controllers.

BACKGROUND TO THE INVENTION

Hand controllers are known wherein a handle is carried at the outer end of an arm extending from a five-bar linkage. In known arrangements, two of the rotary joints of the five-bar linkage are both equipped with rotary sensors and rotary actuators. A control processor receives signals from the sensors that correspond to the position of a cursor point located at the distal end of the arm in the X-Y plane. The handle, which may be of pen-like form, is used to move the distal end of the arm with its cursor point. Signals from the sensors are processed to move a video cursor on the screen of a video terminal in correspondence with the X-Y location of the cursor point within the working space of the controller.

With actuators present, the control processor is able to apply forces to the handle in correspondence with the movement of the cursor point and/or in relation with images present on the video terminal screen, providing haptic feed-back to a user. For example, in computer-aided drafting, a "CAD" system, the presence of a line on the screen can be haptically signalled to a user by a resistance to movement of the cursor point that would cause the video cursor to otherwise move across a line present on the video screen.

In the prior art system disclosed above, no provision is made for input to be provided in response to movement of the handle in the Z direction. No provision is made for the arm to be actuated in the Z direction or otherwise function in response to motion in the Z direction. One object of the present invention is, therefore, to provide an arrangement whereby movement of the cursor point in the Z direction may be exploited to provide additional functionalities, signal input to the control processor and, optionally, haptic feed-back.

In the prior art system referenced, a pressure sensitive tip on a stylus-format handle carried at the end of the arm supported by the planar five-bar link was able to provide signals to the control processor when pressed on to a tablet. These pressure responsive signals were used to mostly replace the function of a button. No provision was made, however to use such signals to control the character of the haptic stimulus generated by the hand controller. Further, no information as to the position of the stylus in the Z direction (other than contact of the tip with a tablet) was combined with the output from the pressure sensitive tip to affect the operation of the hand controller. The present invention addresses these omissions to provide improved functionality in a hand controller.

In actuating a haptic controller based on rotary devices that control rotary joints in a five-bar linkage, it has been felt necessary in the past to use discrete electromagnetic torquing devices. These devices, called -"torquers"-, have operated on the basis of the Lorentz effect wherein a moving coil positioned within a magnetic field tends to or exert a torque or a force, that depends on the current passing through the coil. When multiple, discrete torquers are employed, the parts of the respective torquers are duplicated in each other. An object of this invention is to provide a torquing device wherein two or more torquing arms share commons structural aspects, thus reducing the total parts needed in providing two rotary actuators.

The invention in its general form will first be described, and then its implementation in terms of specific embodiments will be detailed with reference to the drawings following hereafter. These embodiments are intended to demonstrate the principle of the invention, and the manner of its implementation. The invention in its broadest and more specific forms will then be further described, and defined, in each of the individual claims which conclude this Specification.

SUMMARY OF THE INVENTION

According to one aspect of the invention, a hand controller incorporates a sensing arm assembly for a position sensing mechanism comprising:

(a) an arm having a moveable operative end and a mounted end carried by a fixed base;

(b) support means coupled between the mounted end of the arm and the base, said support means providing the arm with two degrees of freedom in horizontal directions about the base and one rotational degree of freedom about an arm rotational axis located at the mounted end of the arm, said arm rotational axis permitting the operational end of the arm to be displaced vertically with respect to the horizontal plane;

(c) horizontal position sensing means carried by the base to sense the location of the operative end of the arm in horizontal directions;

(d) vertical displacement sensing means carried by the base, and preferably positioned at the mounted end of the arm, to sense the vertical displacement of the operative end of the arm with respect to the mounted end;

(e) output means coupled to the horizontal position sensing means and to the vertical displacement sensing means to provide output signals from such sensing means whereby the output signals correspond to the location of the operative end of the arm in three dimensional space.

Such a sensing arm assembly is suited for use in an hand controller having a handle mounted at the operative end of the arm for movement of such end, and a cursor point located therein, through space.

The invention in an alternate description is directed to a hand controller comprising:

(a) a base;

(b) a grasping handle free for movement about a horizontal plane;

(c) a linkage positioned between the base and the handle having base and distal ends;

(d) horizontal position sensors carried by the base to provide signals corresponding with the position of the grasping handle with respect to the horizontal plane; and (e) an arm extending between the handle and the distal end of the linkage, characterized by:

(i) hinge means carried by the linkage permitting the arm to be displaced upwardly and downwardly with respect to the horizontal plane; and (ii) vertical displacement sensing means carried by the linkage for sensing the vertical displacement of the grasping handle.

Again this hand controller may include biasing means connected between the linkage and the arm for returning the grasping handle to a zero position in respect of vertical displacements in at least one vertical direction. This biasing means may provide a restoring force directing the handle towards the zero position wherein the restoring force varies linearly or functionally the displacement of the handle end from the zero position.

The zero position for the cursor point may be located in a plane that is elevated above the surface over which the cursor point may move, thereby providing a "virtual tablet" surface; or it may cause the operative end of the arm to become automatically parked against an actual tablet surface.

In effect the arm of the invention has one rotational degree of freedom about an arm rotational axis located at the base end of the arm, this arm rotational axis preferably lying substantially in the horizontal plane. This axis permits the operational end of the arm to be displaced vertically with respect to the mounted end. To this combination may be added vertical displacement sensing means positioned at the mounted end of the arm to sense the vertical displacement of the operative end of the arm whereby a signal corresponding to the location of the operative end of the arm in the vertical direction is provided.

As a convenient means of providing the restoring force, the sensing arm may be equipped at its mounted end with an elastically bendable protrusion coupled at its root end to the arm, functioning as an elastic hinge. This protrusion has a protruding, free end that is constrained against vertical displacement in at least one vertical direction by a seat carried indirectly by the base through the intervening linkages. This is one example of a biasing means for positioning the arm. Other known biasing means, such as those using coil or leaf springs, may also be employed.

The mounted end of the arm may also include a position sensor that relies on a reflecting surface present on the arm. This surface, which is displaced with the arm, serves as part of the vertical displacement sensing means. A light detector is positioned to sense the vertical movement of the operative end of the arm by the reflection of light off of the reflecting surface as it moves with the mounted end of the arm. As the reflecting surface rotates with the arm, the light detector is able to sense the rotation of the arm by the amount of reflected light that it receives off of the reflecting surface. This is one example of a position sensor for the arm. Other known sensor arrangements, such as those using rotating potentiometers, may also be employed.

As a preferred means of incorporating the sensing arm assembly into a hand controller, a five-bar linkage having a base end with a base link, a distal end with two distal links separated from the base end by two intermediate, proximal links, may be employed as a support means for the arm. This linkage extends from the base and is connected to the mounted end of the arm through one of the distal links of the five-bar linkage. In this arrangement the horizontal position sensing means may be located astride the five-bar linkage and the base, sensing the orientation of the proximal links and thereby the position of the distal links and the operative end of the arm in the X, Y directions.

More specifically, the horizontal position sensing means may be in the form of two rotational sensors carried by the base and respectively connected to a proximal link, the rotational sensors each having a common, shared, axis of rotation, ie. their axes substantially coincide with each other. These rotational sensors may conveniently be constructed in a compact form combined with actuators as next described below.

As a further feature of the invention, the arm assembly may include not only horizontal position sensors but also linkage actuators whereby the operative end of the arm may apply forces in horizontal directions, with arbitrary direction and intensity, to the handle. A similar actuator arrangement may actuate the handle in the vertical direction.

A preferred form of torquing actuator capable of applying two or more independent torquing forces to a corresponding number of linkages in the assembly may comprise:

(1) a frame having a central axis;
(2) one or more magnetic circuits formed by corresponding one or more magnets carried by the frame and positioned to provide in an adjacent air gap a plurality of spatially separated, reversing, magnetic field regions;
(3) two or more electrical coils respectively coupled to output links, the coils being supported-within the frame for rotation about the central axis and each being positioned within the air gap to intercept the one or more magnetic circuits respectively across one of the reversing magnetic field regions; and
(4) electrical coil activation means for supplying current to said multiple coils, whereby, upon activation of said coils, the output links may be caused to be independently activated. By positioning the respective coils in a shared or overlapping air gap, mounted for rotation on trajectories which would collide or intersect if extended, a highly compact arrangement for providing a multiple torquer assembly may be constructed.

Further features of the invention include the presence on the handle, preferably on a handle of pen-like format, of one or more switches and/or electrical sensors that may be actuated by the users. These switches may provide off-on signals to a central control processor. employment of a grip pressure sensor will provide a varying output dependent upon finger pressure.

Such grip pressure sensors may operate to provide a variety of functional consequences when included as part of a haptic hand controller system. As a preferred feature, pressure applied to such a sensor may be used to control the intensity or level of detail with which haptic feedback is provided to the user in proportion to the degree of pressure applied to the handle. Alternately, or cumulatively, the pressure signal from the handle may be combined with the position of the handle with respect to the vertical or "Z" axis to cause the control processor to vary the presence or absence of haptic feedback in conjunction with the position of a video cursor on a video display screen. Both off-on and pressure signals from this handle may be combined with position signals from the arm position sensor to provide multiple levels or "playing fields" in which the haptic behaviour of the system differs.

The foregoing summarizes the principal features of the invention and some of its optional aspects. The invention may be further understood by the description of the preferred embodiments, in conjunction with the drawings, which now follow.

DESCRIPTION OF THE PREFERRED EMBODIMENT

Figure 1:
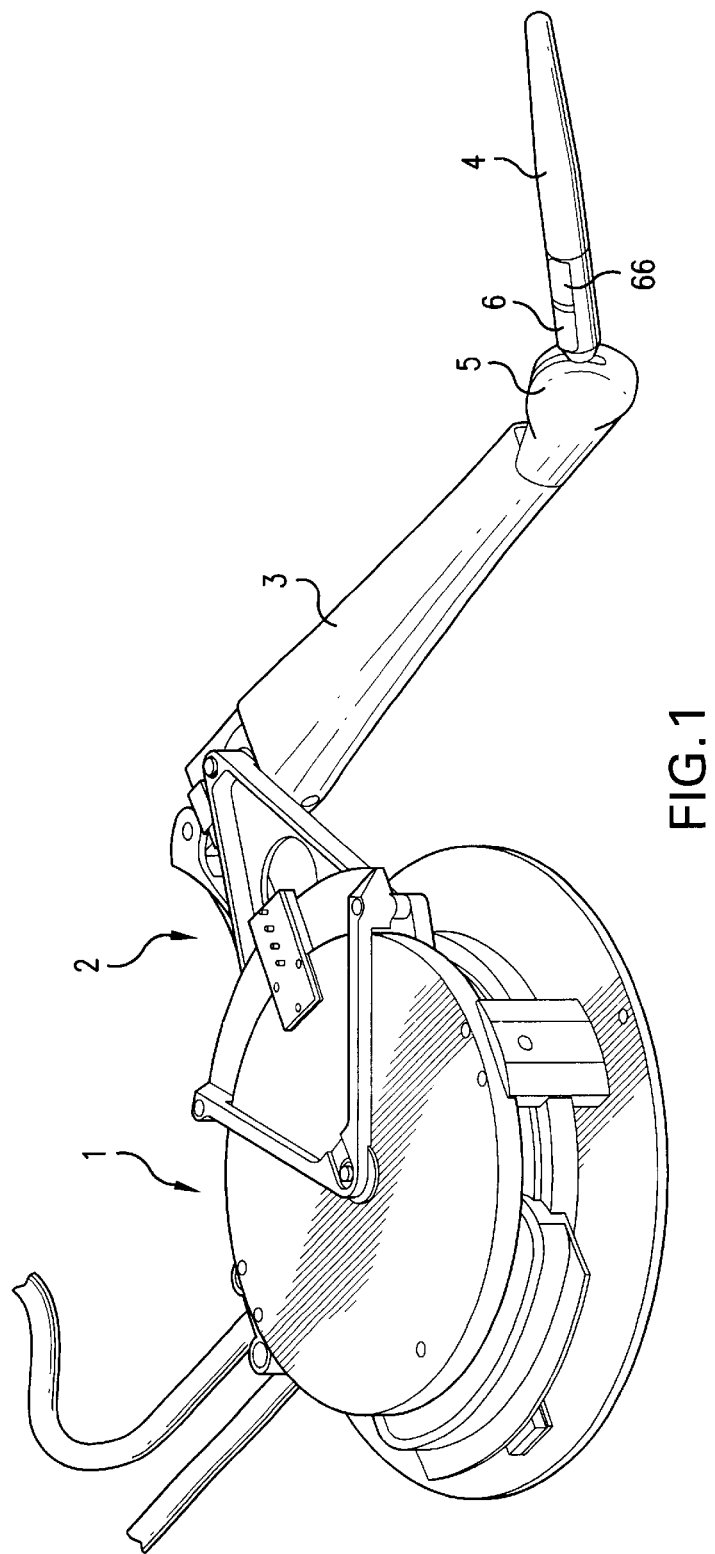
FIG. 1 is a perspective view of a hand controller having a base, an arm and a handle, according to the invention.

In FIG. 1 a controller according to the invention is shown having a base 1, a 5-bar linkage 2 and a control arm 3 connected to a distal link in the 5-bar linkage 2.

At the end of the arm 3 is a control handle 4 for a user to grasp, preferably of pencil-like form. This handle 4 extends upwardly from a gimballed joint 5 mounted at the operative end of the arm 3, remote from its mounted end at the five-bar linkage 2. A user-actuable switch 6 (or switches) may optionally be carried on the handle 4. A grip pressure sensor 66 may optionally be carried on the handle 4.

Figure 2:
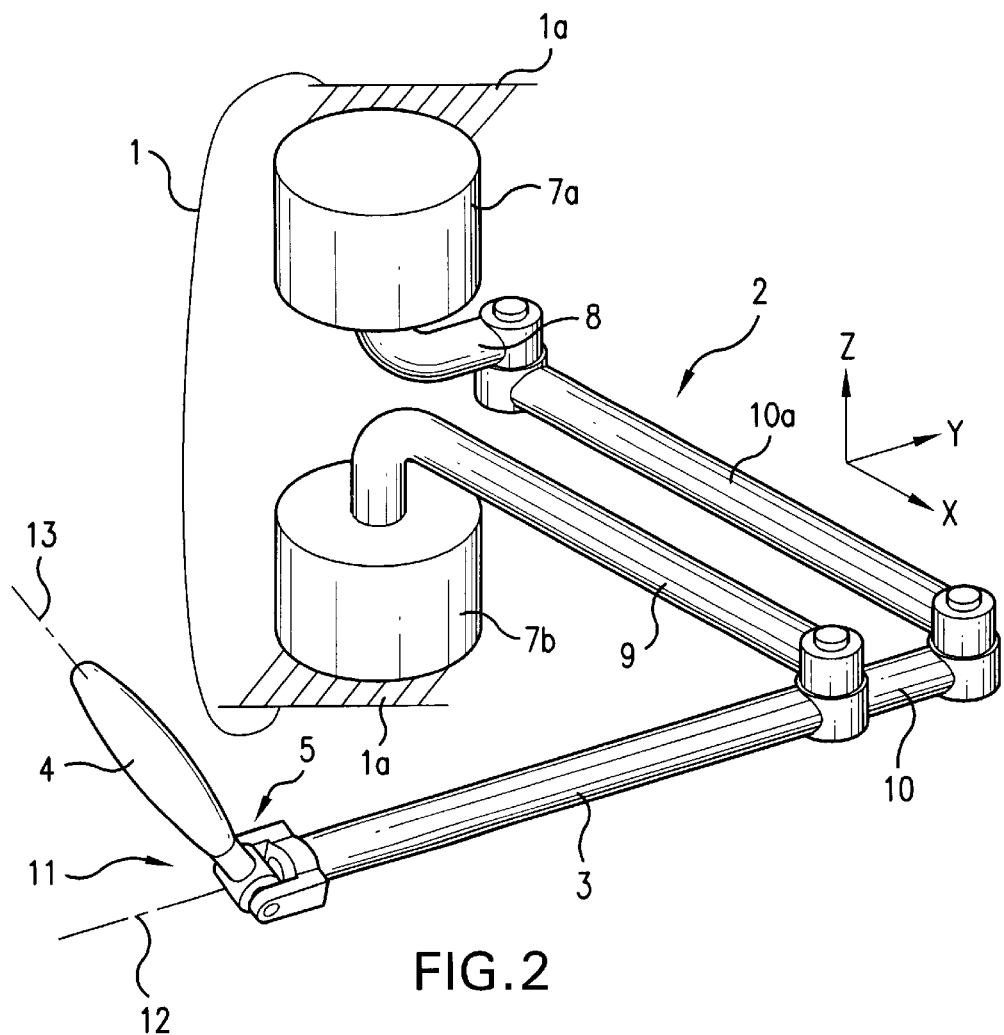
FIG. 2 is a perspective schematic depiction of a prior art hand controller kinematic arrangement wherein the arm is limited to movement in the X, Y directions only.

The principle of the kinematic structure of the 5-bar system is depicted schematically in FIG. 2. The base 1 provides grounding points 1a for two torque-generating actuators or torquers 7a, 7b. While identified as torquers, these components could be sensors or combined sensors and torquers. These torquers 7a, 7b are mounted at the base end of the 5-bar linkage 2 and drive respective proximal links 8, 9. These proximal links 8, 9 are joined at their ends opposite the base end by two distal links 10, 10a. The arm 3 in FIG. 2 is a direct extension of the distal link 10.

Within the gimballed joint 5 at its central point is the point in space identified as the cursor point 11. This cursor point 11 lies at the intersection of the arm 3 and handle central axes 12, 13 and is free to move in the plane of the X and Y directions in conjunction with the 5-bar linkage 2. As depicted in FIG. 2, the arm 3 and cursor point 11 have no freedom of movement in the direction of the Z axis. FIG. 2 is a prior art configuration.

Figure 3:
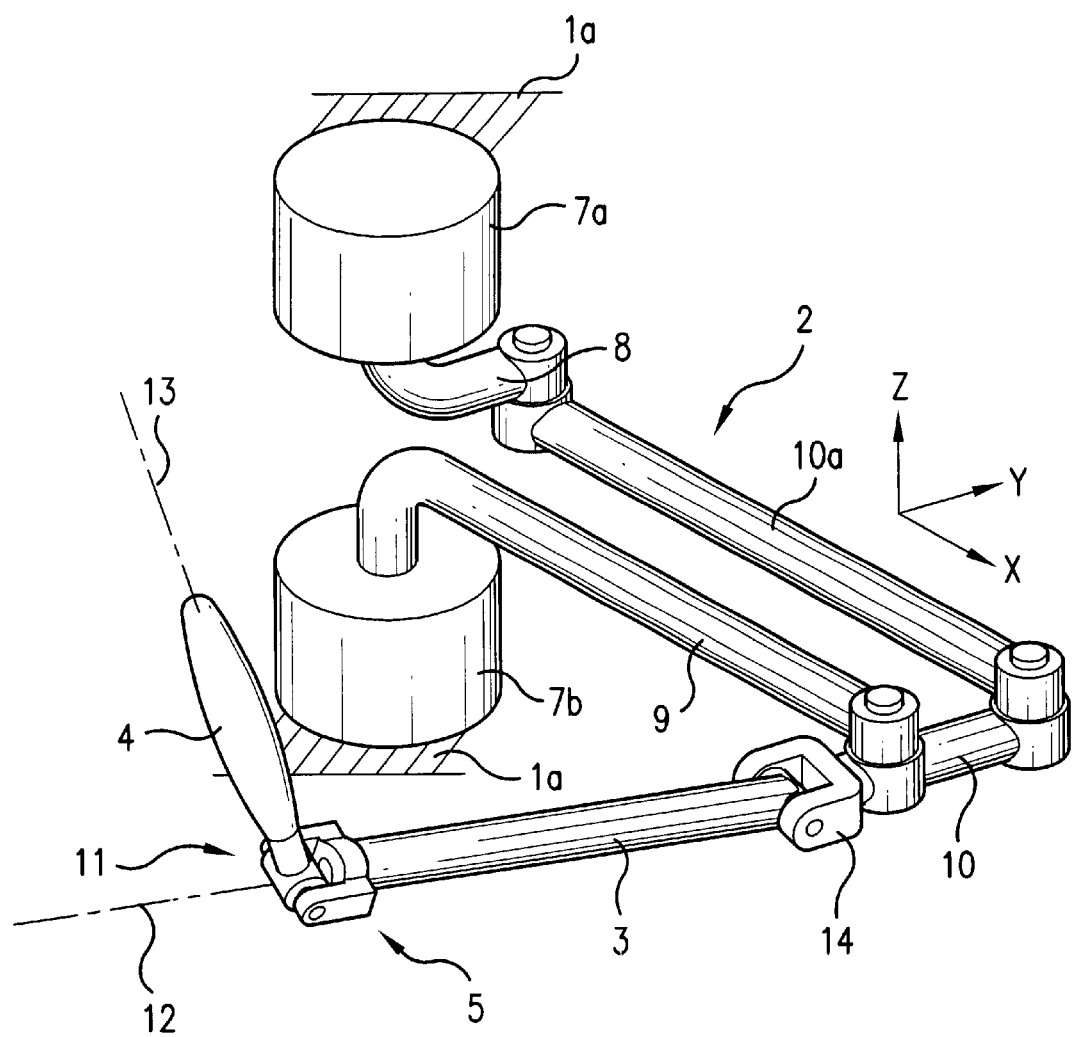
FIG. 3 is a perspective schematic depiction of the kinematic arrangement of the components of FIG. 1 wherein the arm is mounted at a rotary joint that permits its outer end to be elevated in the Z direction.

In FIG. 3 the arm 3 is provided with a single axis, rotating "hooke" joint 14 at its mounted, hinged end near the supporting distal link 10. This hooke joint allows the cursor point 11 to be displaced in the direction of the Z axis, providing a basic feature of the present invention.

Figure 3A:
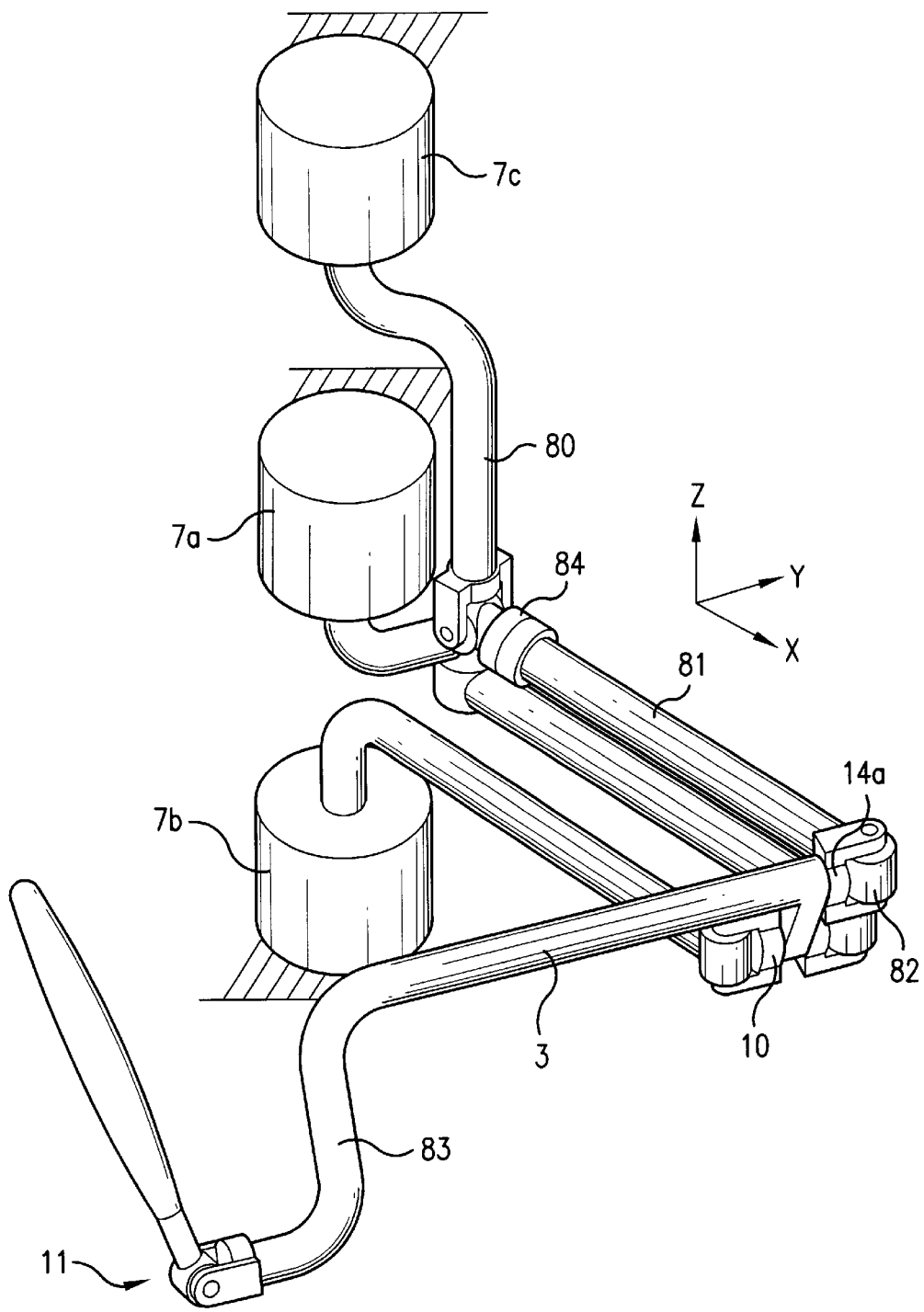
FIG. 3A is a variant of FIG. 3 including actuation means for raising the arm in the Z direction.

In FIG. 3A a third actuator 7c is depicted providing for actuation of the arm 3 about link 10 in order to actuate the location of cursor point 11 in the Z direction. A first crank 80 from the actuator 7c displaces link 81 through a 3 degree of freedom joint 84 link 81 is attached to an elbow 82 that joins the arm 3 to the distal link 10 through a hinged joint 14A. A further cranked end portion 83 on the arm 3 allows haptic feedback to be provided in the Z direction.

Figure 3B:
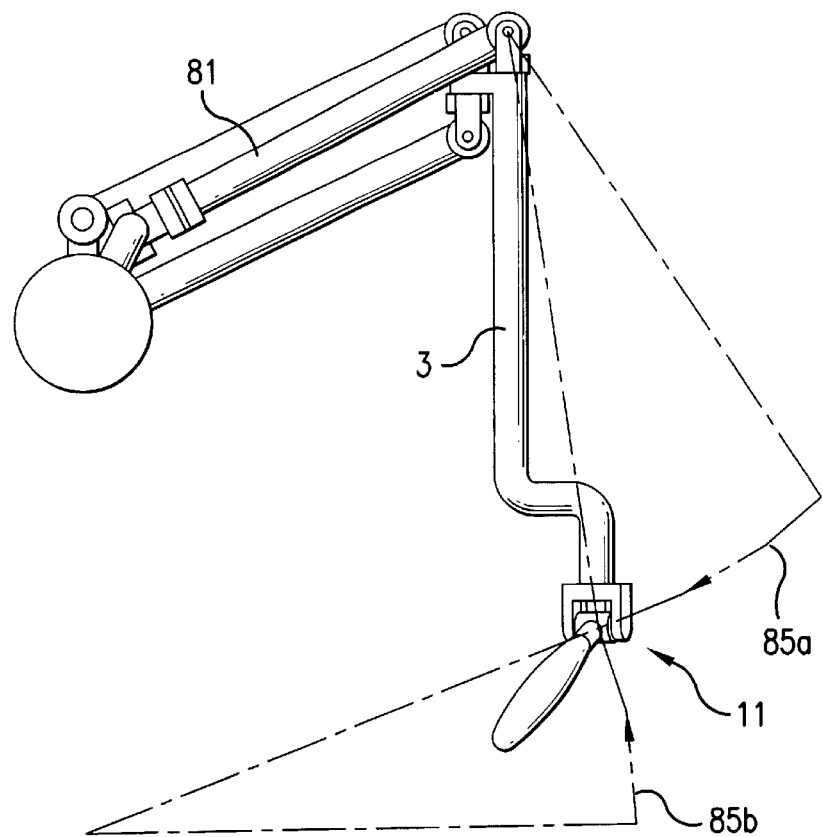
FIG. 3B is a schematic plan view of the controller of FIG. 3A which is actuated in three dimensions.
Figure 3C:
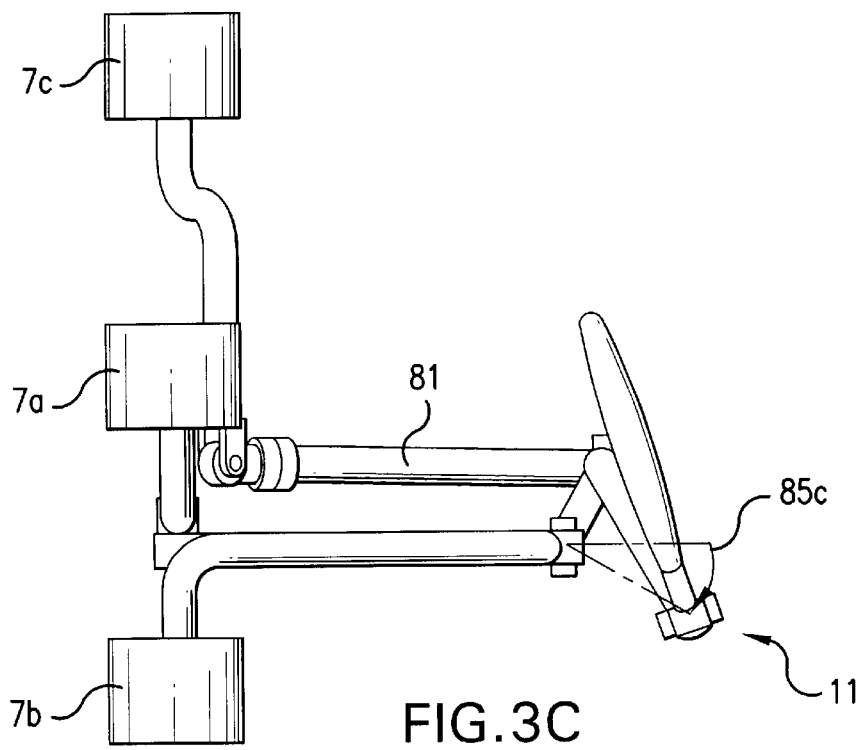
FIG. 3C is a side view of the controller of FIG. 3A.

In FIGS. 3B and 3C the permitted paths 85a, 85b, 85c of the cursor point 11 in three dimensions is illustrated. This linkage takes advantage of the coaxial nature of torquers sensors assemblies 7a, 7b, 7c, as on FIG. 9a.

Figure 4:
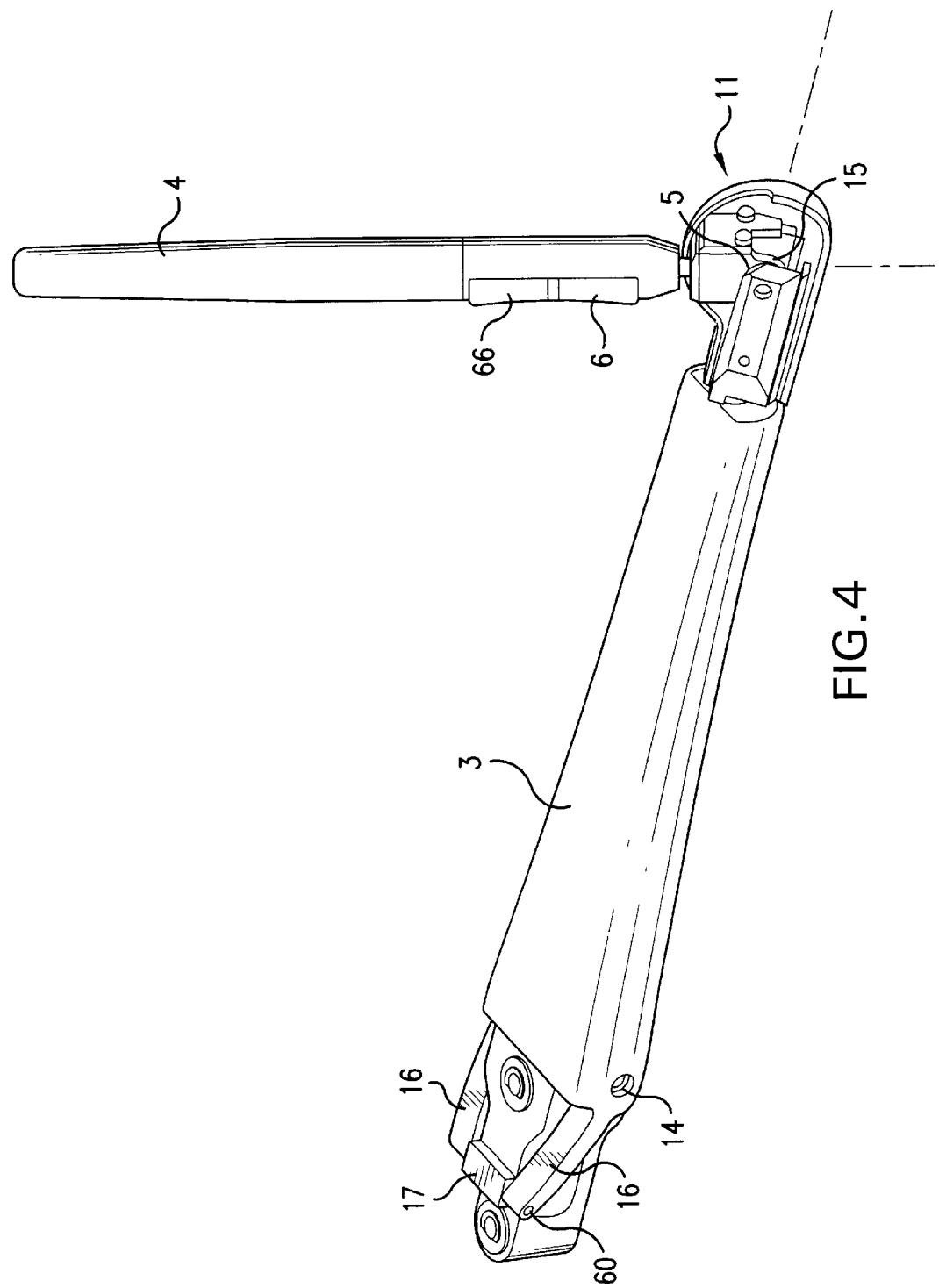
FIG. 4 is a pictorial detail of the arm and handle of FIG. 1 with a cutaway depiction of the gimballed joint between such elements.

In FIG. 4 details of the arm 3 and handle 4 of FIG. 1 are shown. Wires 15 from a control processor are dressed to pass through the centre of the gimbal joint 5 to connect to the switch(es) 6 and/or the grip pressure sensor 66 on the handle 4. These switches 6 may operate as standard mouse switches.

At the hinged end of the arm 3 a resilient spring means is provided in the form of a pair of elastically bendable stubs 16 that rotate with the arm 3 but are constrained, at their free ends, by a seat 17. While depicted in FIGS. 4 and 5A, 5B as incorporating a hinge pin 60 that passes through a hole in the stubs 16 (rather than a slot, relying on compression and extension of the stubs to permit mobility, seat 17.need only serve to limit the vertical movement of the free end of the stubs 16 in at least one of the two vertical directions.

Figure 5A:
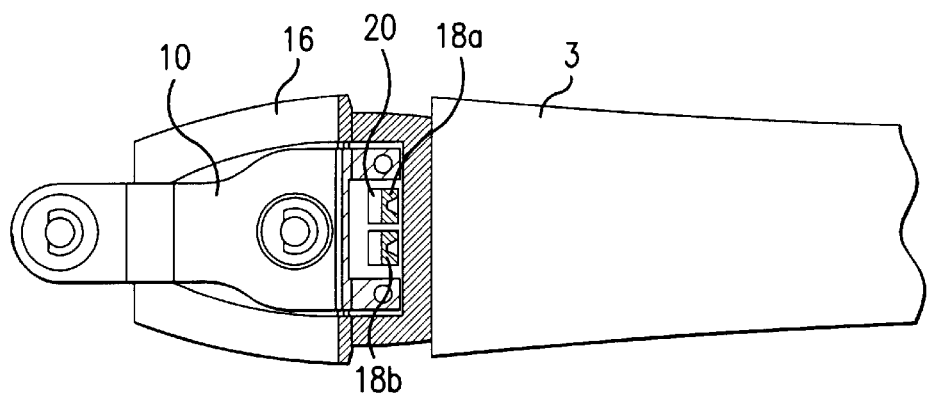
FIG. 5A is a plan view detail of the hinged mounting of the arm to the supporting linkage, showing an elastic, biasing protrusion extending from the end of the arm and a cut-away view of the arm position sensor.
Figure 5B:
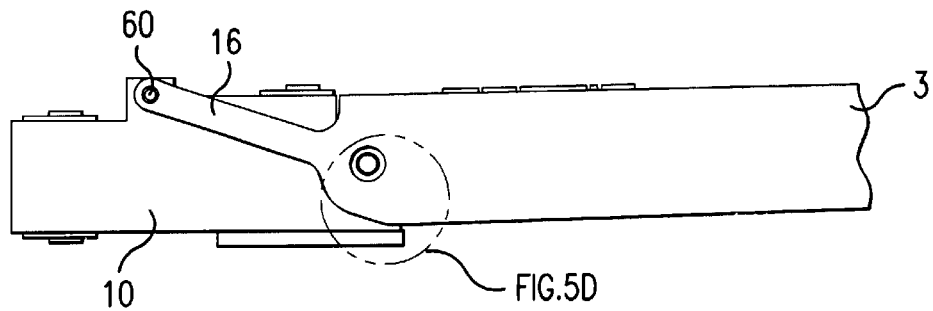
FIG. 5B is a side view of FIG. 5A.
Figure 5C:
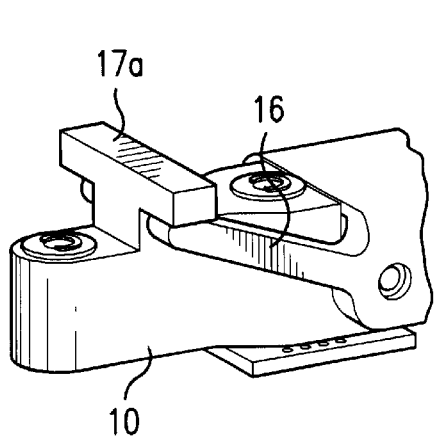
FIG. 5C is an enlarged side view detail of an alternate arrangement for containing the free end of FIG. 5B.

This is shown in FIG. 5C wherein the seat 17a is under-cut to provide a stop surface and lacks a hinge pin 60. The free end of the stubs 16 are be unconstrained in FIG. 5C when displaced downwardly from the seat 17a carried by the link 10. This corresponds to the absence of a restoring force (other than gravity if the weight of the arm is not neutralized) when the handle 4 is raised to elevate the cursor point 11 above the neutral location.

The end of the protrusion 16 is limited in displacement in the other of the two Z directions by the seat 17a. This provides a spring resistance to depression of the arm 3, in contrast to a constant gravitational weight only when the stub 16 separates from the seat 17a.

In FIG. 5B the stubs 16 operate to bias the arm 3 and cursor point 11 to return to a neutral or zero location in both of the Z directions. However, the stubs 16 permit, Z axis movement of the cursor point 11 with a restoring force that generally increases with the degree of displacement of the cursor point 11 from the neutral location. Normally, this restoring force will vary linearly with the vertical displacement of the cursor point 11, but this is not essential and a non-linear response characteristic may also be adopted. The schedule of elastic restoring force established by adjusting the shape of the protrusions 16.

Figure 5D:
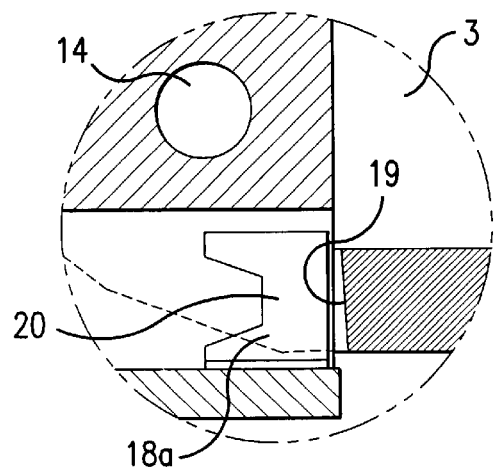
FIG. 5D is an enlarged side view detail of the position sensing feature for the arm of FIGS. 5A, 5B.

An arm position sensor 20, as shown in FIGS. 5A and 5D detects the elevation of the arm 3. The arm position sensor 20 optionally operates on the basis of the illumination by a light source 18a and sensing by a light detector 18b directed towards reflecting surface portion 19 carried at the hinged end of the arm 3. Displacement of the arm 3 is detected through the light detector 18b whose output varies as the illuminated surface 19 is displaced within its field of vision in conjunction with the rotation of the arm 3 about its hinge 14.

The output signal from the Z-axis arm position sensor 20 may be used to provide a variety of control functions. This may include broadening a line being drawn on a video screen 69 (shown on FIG. 15) in proportion to the degree of depression of the cursor point 11 below the neutral point. Other possible control functions include the provision to the control processor of a signal which will increase the intensity of haptic feedback to a degree which is proportional to the effort made to depress the cursor point 11 below, or effort made to raise it above, the zero position. The features are addressed in greater depth below.

Figure 6:
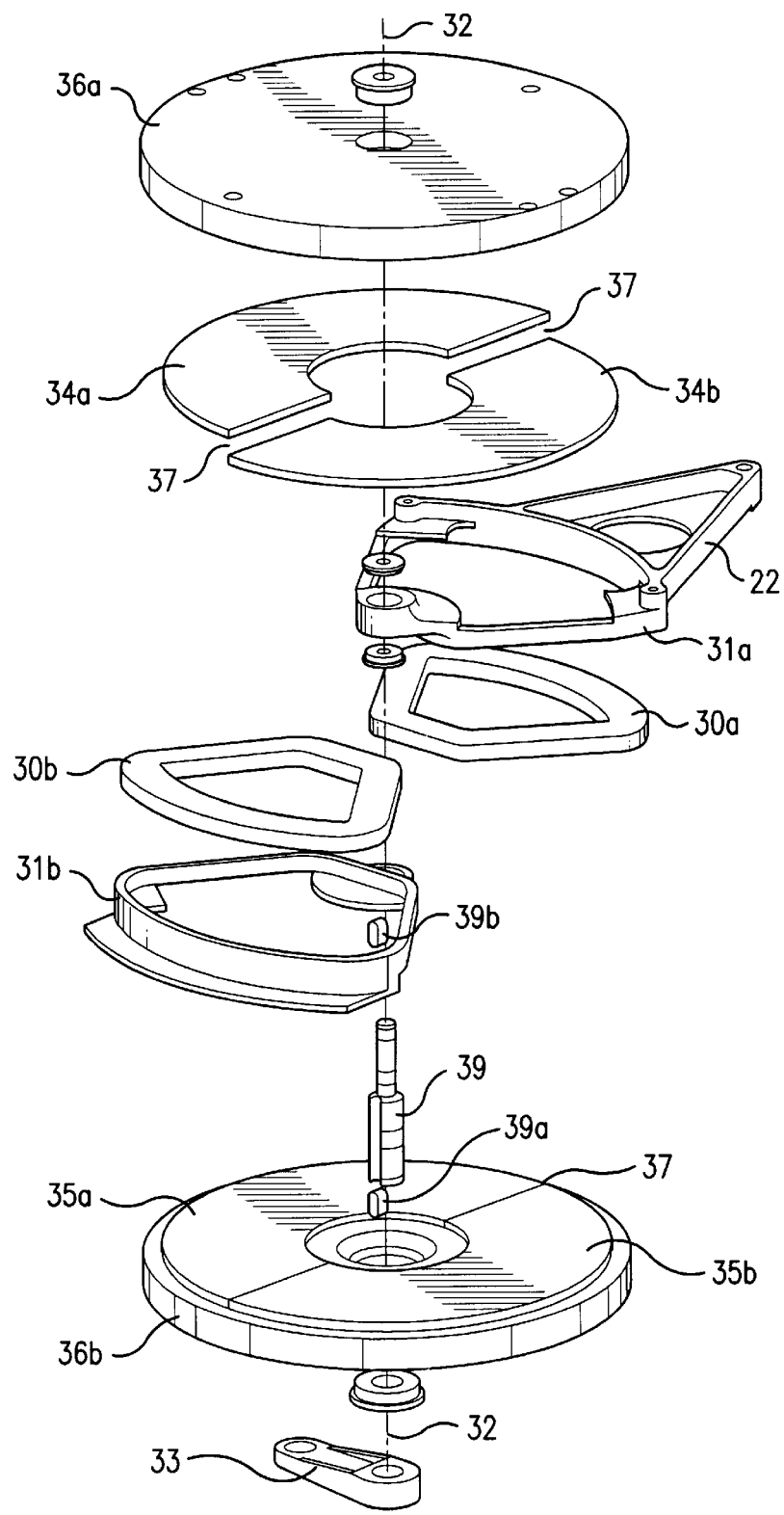
FIG. 6 is an exploded isometric assembly diagram of the parts comprising the two torquers carried by the base of FIG. 1 and functioning in the place of the rotary actuators in FIG. 3.

The torquers 7a, 7b of FIG. 3 are conveniently combined into a compact unit depicted in the exploded view FIG. 6. Electrical coils 30a, 30b are mounted in support brackets 31a, 31b that swing on joints about a common central axis 32. A torqued link arm 22 extends from the upper bracket 31a to serve, for example, as the actuated proximal link 9 in FIG. 3. A further torqued link 33, corresponding for example to elbow 8 in FIG. 3, is coupled by keys 39a, 39b through shaft 39 extending from the lower bracket 31b to serve as the activated proximal link 8 to actuate its rotary motion.

Figure 7:
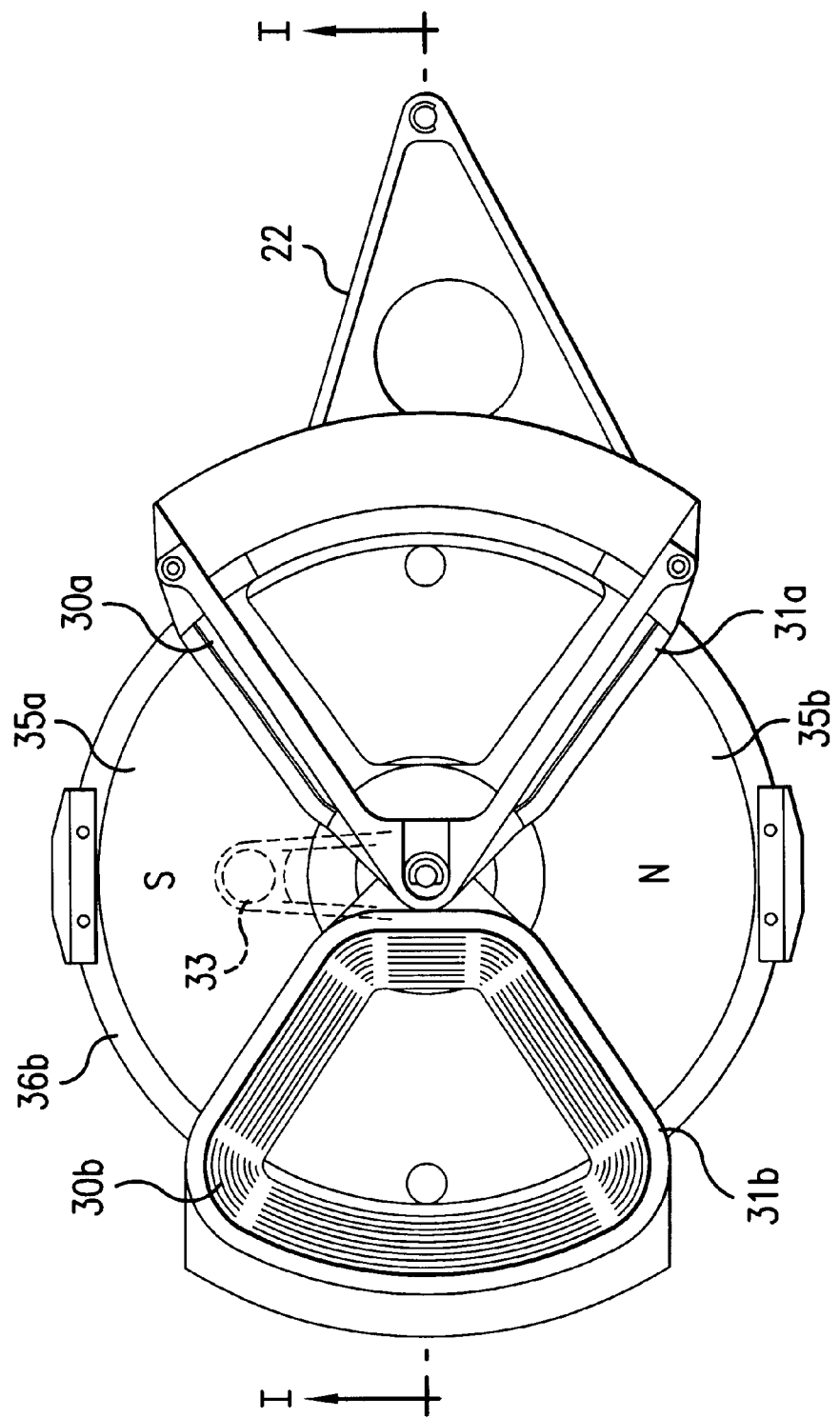
FIG. 7 is a plan view of the pair of torquers incorporated at the base of the five-bar linkage of FIG. 3, each torquer including a coil positioned over a magnetic reversing region.
Figure 8:
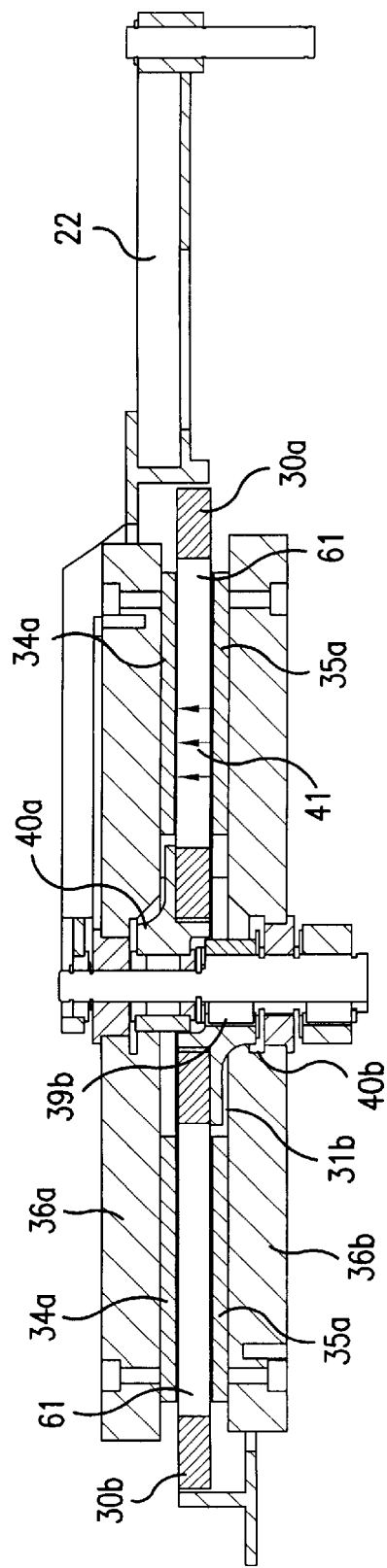
FIG. 8 is a side cross-sectional view of FIG. 7.
Figure 9:
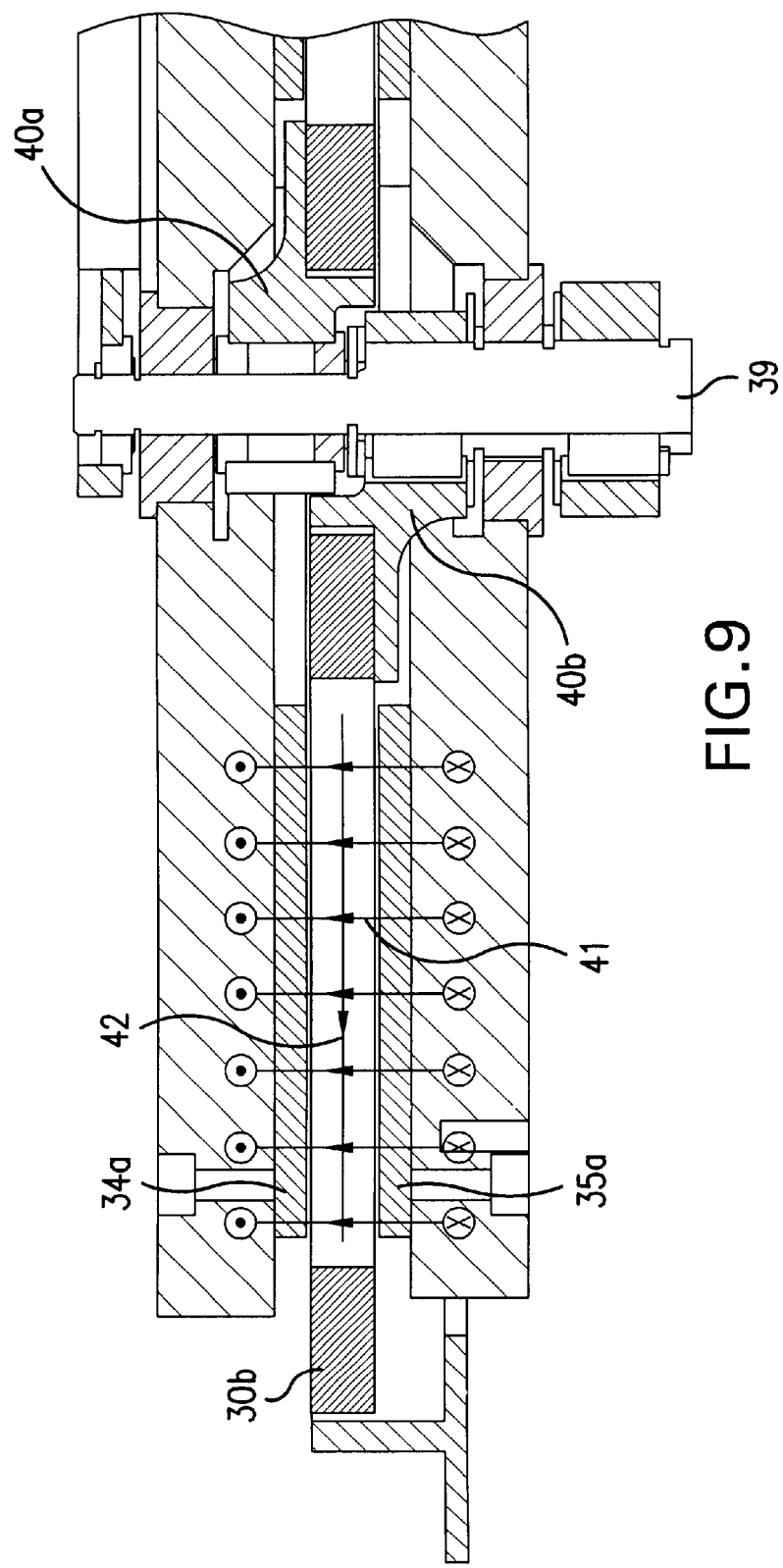
FIG. 9 is a detailed cross-sectional view of a portion of FIG. 8 showing magnetic flux lines.

In FIGS. 6, 7 and 8 two upper magnets 34a, 34b and two lower magnets 35a, 35b are provided. While four magnets are shown, two would suffice, with magnetic return media serving in the place of the other omitted magnets. These magnets, positioned vertically to create an air gap 61 there between occupied by the brackets 31a, 31b, and coils 30a, 30b are deployed to create a closed, encircling field of magnetic flux, guided by upper and lower magnetic return plates 36a, 36b. The respective orientation of the magnetic flux lines 41 and electrical coil current 42 on one side of the reversing region 37 (shown in FIG. 6) are shown in FIGS. 8 and 9.

The two torquer coils 30a, 30b are positioned to intercept magnetic lines of flux directed in two directions, vis, the coils 30a, 30b are located in the air gap 61 over the boundaries between the sets of upper 34a, 34b and lower 35a, 35b magnets, positioned astride the reversing magnetic field regions 37. So long as the coils 30a, 30b overlie these reversing regions 37, the presence of an electrical current passing through the coils 30a, 30b will create a torquing force that biases the coils 30a, 30b and their respective brackets 31a, 31b to rotate about the central axis 39 for the two torquers. Thus, the two rotating bracket assemblies 31a, 31b are mounted in rotational supports that allow them to swing in circular trajectories that, if extended, would intercept each other.

In the FIGS. 6, 7 and 8 the mechanical action for one torquer associated with the bracket 31a is coupled though the protruding link 22. The mechanical action for the second torquer associated with the bracket 31b is effected through the main shaft 39 to which the bracket 31b is keyed via key 39a, and a cranking arm 33 which is also keyed to the main shaft 39 via key 39b.

The brackets 31a, 31b have offset rotational supports 40a, 40b that allow the brackets 31a, 31b to be approximately aligned in the same plane and occupy the common air gap 61. A further consequence of this arrangement is that the circular trajectory for each torquer rotating about the common axis 39 will, when extended, intersect. While this potential interference limits the relative span of action for each torquer bracket 31a, 31b to non-interfering relative positions, this arrangement by which the torquers are mounted to swing on potentially intersecting trajectories leads to a highly compact mechanical assembly with efficiently utilized shared components, vis a common air gap 61 and single magnetic circuit for the magnetic flux 41 serves for both torquers.

Figure 9A:
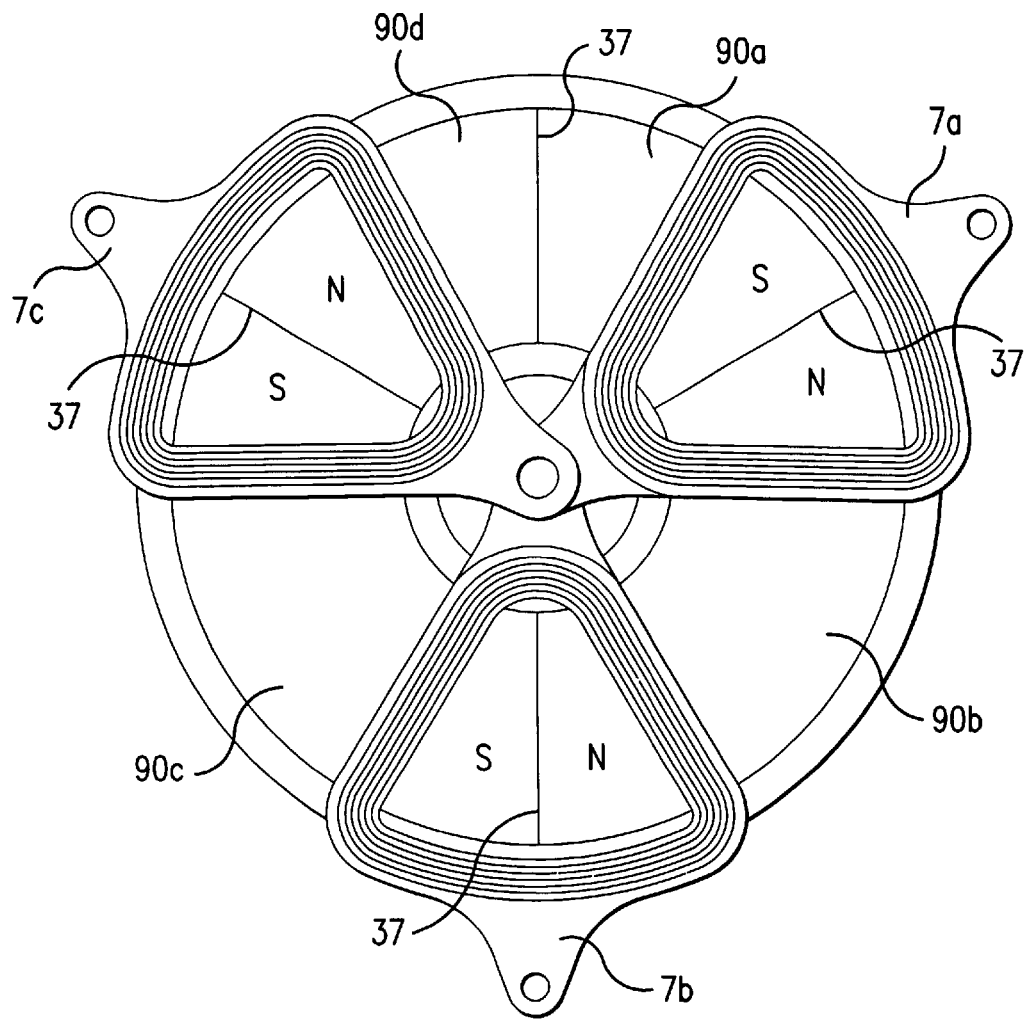
FIG. 9A is a schematic plan view of the essential components of an assembly of three torquer coils positioned over magnetic reversing regions.
Figure 10:
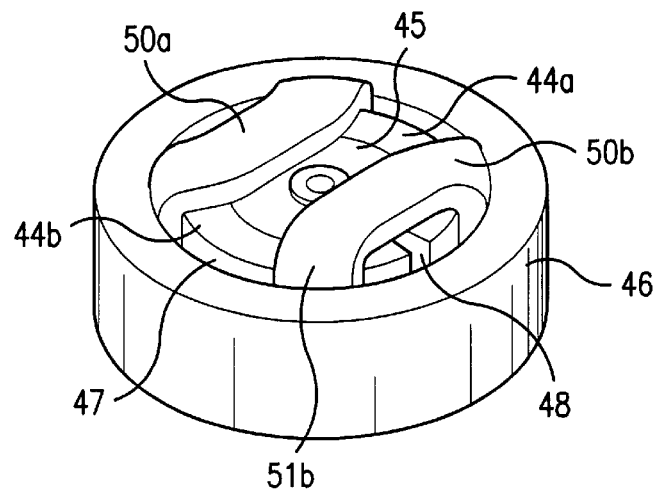
FIG. 10 is a perspective view of an alternate dual-torque assembly wherein annular magnets accommodate coils that are positioned about the axis of the combined assembly.
Figure 11:
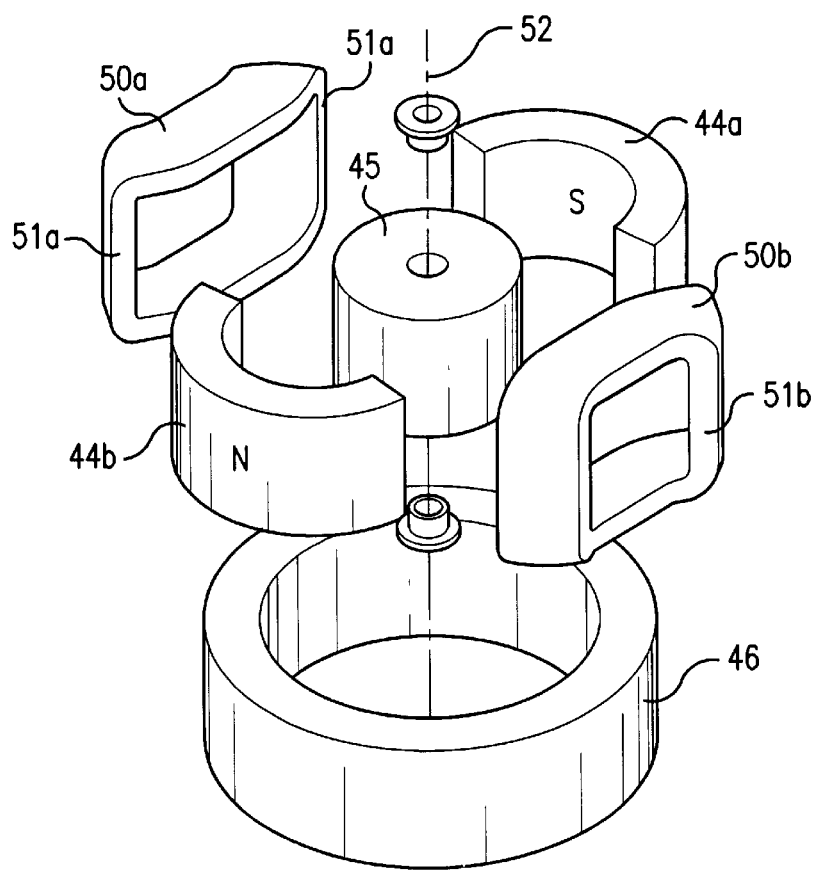
FIG. 11 is an exploded view of FIG. 10.
Figure 12:
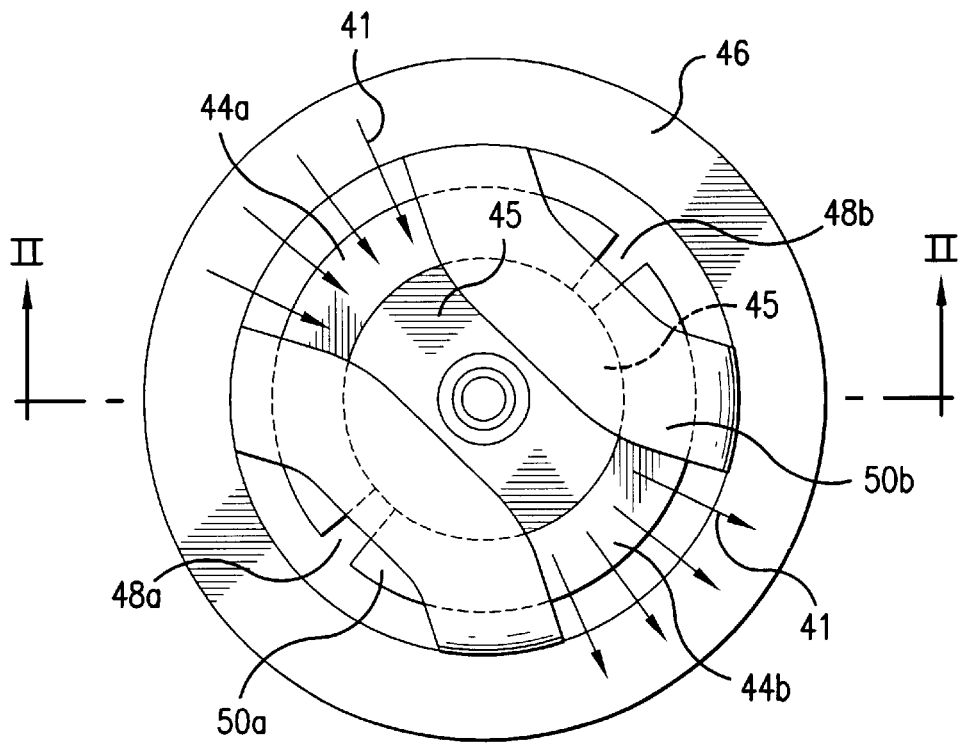
FIG. 12 is a plan view of FIG. 10 showing magnetic flux lines.
Figure 13:
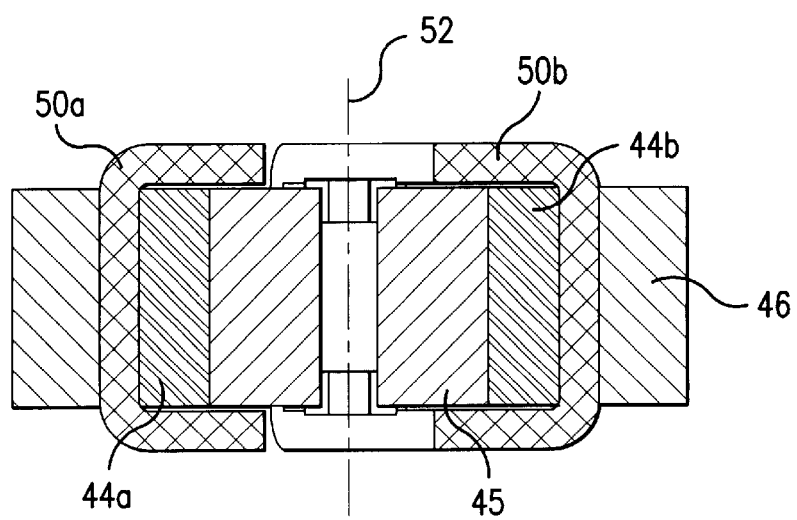
FIG. 13 is a cross-sectional view of FIG. 12.

In FIG. 9A an assembly of three torquer coils 7a, 7b, 7c is shown. Four magnets 90a, 90b, 90c, 90d are present providing four reversing flux regions 37. Four such regions are present in order that the magnetic circuit is a closed, endless loop. The third torquer 7c present may be used to actuate the arm 3 in the Z direction, as shown in FIG. 3A.

FIGS. 6–9 depict a torquer assembly wherein the electrical coils 30a, 30b substantially lie in a common, horizontal plane. FIGS. 10–13 show an alternate arrangement utilizing two semi-annular magnets 44a, 44b. These magnets 44a, 44b are positioned around a central, cylindrical magnetic return 45 and are surrounded by an outer return 46 in the form of a cylindrical sleeve 46. An annular air gap 47 exists between the outer return 46 and the magnets 44a, 44b. Alternatively, return 45 could be a monolithic magnet, eliminating the need for magnets 44a, 44b.

Coils 50a, 50b are positioned with respective pairs of vertical legs 51a, 51b passing axially through the air gap 47, in parallel with the central axis 52 that passes through the central return 45. With the coils 50a, 50b positioned astride the magnetic reversing field regions 48a, 48b, a rotationally-directed torque arises and is applied to the coils 50a, 50b when a current passes therethrough.

While brackets and links for supporting the coils 50a, 50b and extracting mechanical action are not shown in FIGS. 10–13 similar results can be achieved with this cylindrical paired torquer design to that obtained from the planar version of FIGS. 6–9. In both cases, activated electrical coils 30a, 30b; 50a, 50b, are constrained to rotate on rotary trajectories that would, if extended, intersect. Also, both units conveniently share a common air gap 61, 47 and a single, common magnetic circuit wherein the magnetic flux 41 flows in a single endless path. Both of these design alternatives therefore enjoy the benefits of a reduced parts count. These configurations are also conveniently suited to driving 5-bar linkages 2 of the type depicted in FIGS. 1 and 3.

Figure 14:
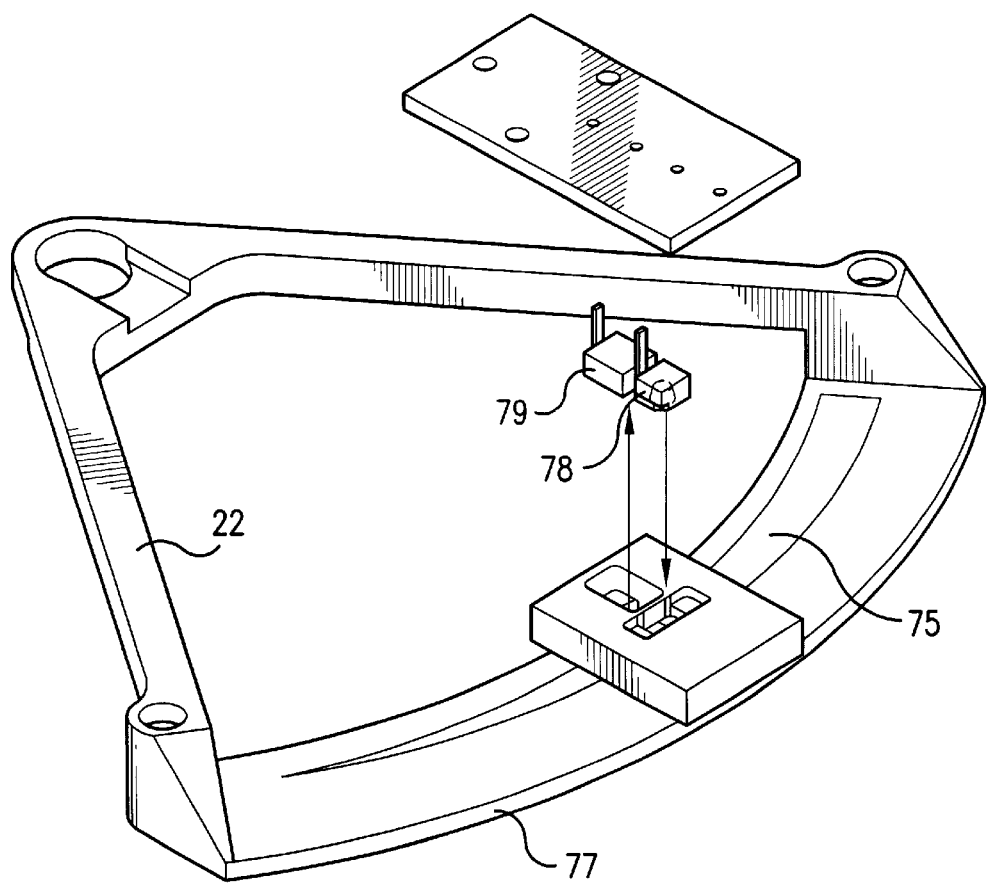
FIG. 14 is a detailed perspective view of the position sensing device carried by the torquers of FIG. 3A.

The sensor aspect of the invention is shown in FIG. 14 wherein a sample swatch 75 is mounted on a carrier flange 77 that rotates with the actuator 7a, 7b. Fixed to the base and overlying the swatch 75 is a combination illuminator 78 and light sensor 79. The illumination of the swatch 75 is sensed by the sensor 79. By reason of the graduated or tapered shape of the pattern carried by the swatch 79, the intensity of reflected light picked-up by the sensor 79 will vary as the flange 77 is rotated.

This position signal is used by the sensor section 68 to locate the video cursor 11a—on the screen of a video monitor 69—at a position that corresponds to the location of the cursor point 11 in the X, Y plane.

In FIG. 3A, three rotary position sensor assemblies are associated with the X, Y and Z Torquers 7a, 7b, 7c. The carrier flange 77 may be integrated to link 8, 9 and 18. Illuminator 78 and light sensor 78 may be fixed with respect to the base 1. This arrangement allows measurement of displacement of the torquers 7a, 7b, 7c with respect to the base 1.

Thus, the sensors of the invention are able to provide direct outputs that correlate to the positions of the links, and indirectly, the location of the cursor point 11 in space.

Figure 15:
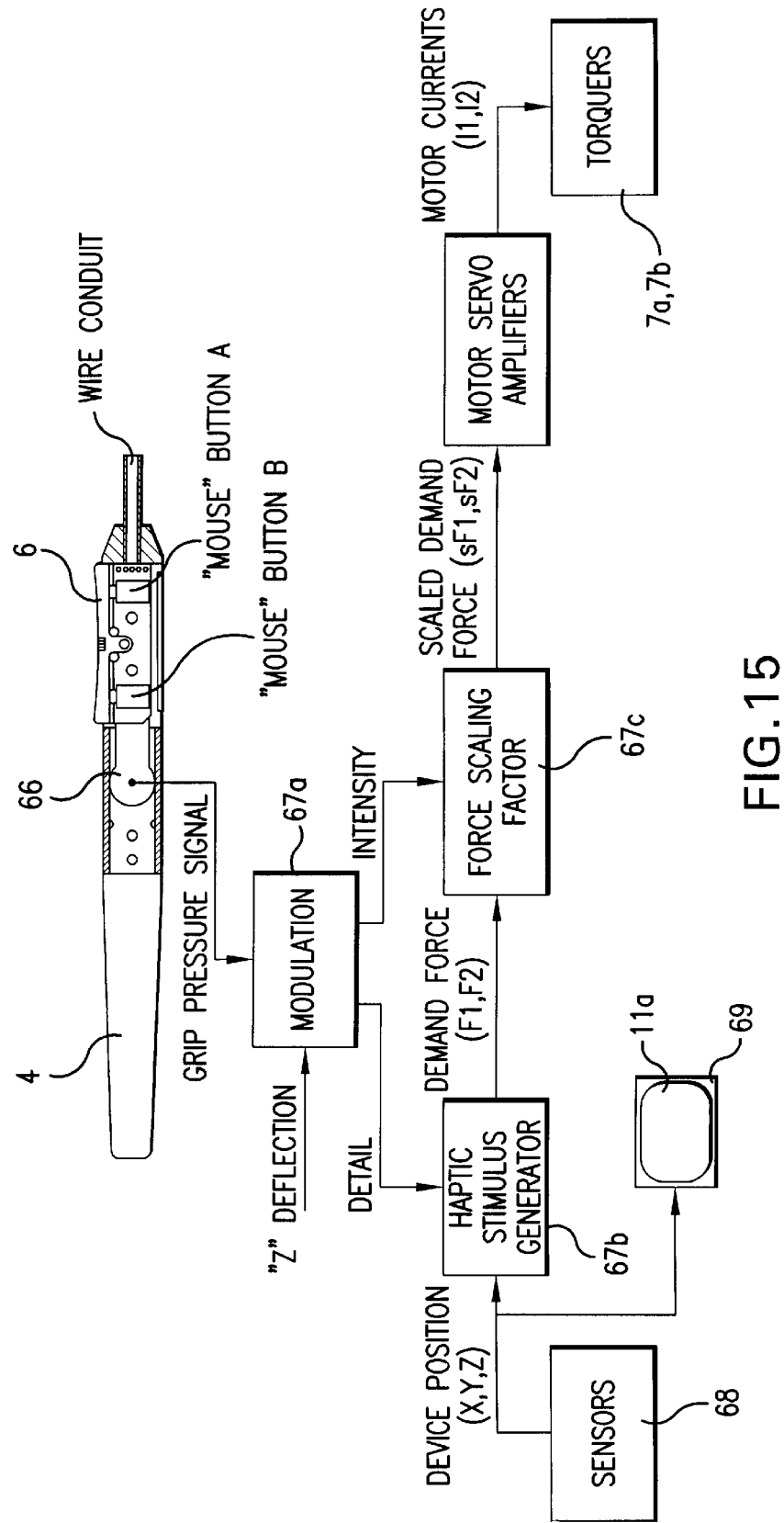
FIG. 15 is a cutaway cross-sectional view of the handle or holder of the hand controller of FIG. 1 showing schematically the logic flow for processing of a grip pressure signal to scale the intensity of Haptic feedback.

In FIG. 15 the handle 4, in the format of a pen has two buttons 6 that operate alternately. A grip pressure sensor 66 provides a signal proportional to applied pressure. This pressure signal is sent through the control sections 67a, 67b, 67c and may be used to vary the force developed by the torquers 7a, 7b. A force would normally be developed by the torquers 7a, 7b, for example upon the collision on the video screen of the video cursor 11a with a graphical object on the video screen 69. The control/processor sections 67a, 67b, 67c transmit a force command to the torquers 7a, 7b in response to the handle 4 position Z deflection and grip pressure. This force command is modulated by a force scaling factor processor section 67c that responds to input from the hand controller. Thus, a new feature of functionality is provided by the hand controller which is ideally integrated with the haptic performance provided by the controller of the invention.

While the idea of measuring grip pressure in an input device (i.e. mouse, pen or graphic input tablet) is not new, used alone, such an input when used in combination with the Z deflection measurement, can realize a set of novel functions relevant to haptic displays.

When these inputs are correlated, the measurement of the two signals can improve the knowledge of the task the user intends to perform; when they are not, the two signals can be used as two independent input signals.

Thus, in a "fly-over", the intent of the user to move from one location of the work space to distance one to reach a feature and find it quickly, while avoiding intervening haptically rendered obstacles. Measuring both deflection and grip permits the control computer to be aware of this intent and to vary or even suppress the haptic feedback during the relevant phases of the task. For example if the Z deflection is positive but moderate but the grip is loose (and the speed is high), fine details of the haptic feedback might be omitted. If the grip were tight, they could be present. If the Z deflection were negative, all feedback could be suppressed. If it were positive and the speed low, overall haptic feedback intensity could be increased.

If the application demands additional reliability in the input data (as in an air-traffic control or automotive applications), simultaneous deflection and grip pressure could be utilized to validate the data (i.e. location of cursor on the screen). Conversely, if the data is found to be invalid by the system (forbidden area), this fact can be more conveniently and safely signified to the user by an absence of haptic feedback when deflection and grip pressure are both applied, rather than repelling the user's hand from the forbidden region.

Many applications require a "station keeping" functionality, whereby the input device is kept at its present place or smoothly driven to a location when the user is not gripping the device. While these functions can be achieved via a conventional "dead man switch", there are advantages in having grip pressure and deflection both available in continuous form to supply these functions. For example, station keeping can be gradually released (by reducing artificial viscosity) as the grip pressure increases. Another similar application is the provision of improved reliability when both deflection and grip pressure are required to be present to release the device, in a smooth trade off of control between the system and the user.

As control stability margins in haptic control systems depend both on the device and the user's grip, the combined knowledge of grip pressure and deflection can be used to improve control performance. In general, higher system performance in terms of band width may be traded for narrower stability margins. Because the user grip can be used to directly increase the stability margins, higher control performance can be safely used when near instability boundaries.

In certain applications (as in training), it is important that users use a correct grasp. The sensing of both deflection and grip pressure can be used to determine the correctness of a grasp.

In applications when the movement of users is recorded for subsequent display and incremental modifications, the knowledge of both deflection and grip pressure can be used to modulate the intensity or details of the guidance during display, or conversely as a measure of learning of a gesture during performance.

The knowledge of the average intensity of the grip and deflection during repeated task performance can be used to check for the potential of a user to develop fatigue or repeated stress injury syndrome (RSI), or to determine the stage of a learning curve that has been reached.

The simultaneous input of the user's grip intensity and handle motion is 3 dimensions can be used to apply haptic feedback in a fashion which is beneficial for persons having motor control disabilities (such as tremor or lack of motor coordination). Previous applications in this area have been mostly concerned with the rehabilitation of person having visual handicaps.

Conclusion

The foregoing has constituted a description of specific embodiments showing how the invention may be applied and put into use. These embodiments are only exemplary. The invention in its broadest, and more specific aspects, is further described and defined in the claims which now follow.

These claims, and the language used therein, are to be understood in terms of the variants of the invention which have been described. They are not to be restricted to such variants, but are to be read as covering the full scope of the invention as is implicit within the invention and the disclosure that has been provided herein.

The embodiments of the invention in which an exclusive property or privilege is claimed are defined as follows:

1. A sensing arm assembly for a position sensing mechanism comprising:
   (a) an arm having a moveable operative end and a mounted end carried by a base;
   (b) an arm support coupled between the mounted end of the arm and the base, said arm support providing the operative end of the arm with two degrees of freedom in a plane with respect to the base, wherein said arm support includes a five-bar linkage having a base linkage, two distal links, and two proximal links, each of said distal links separated from the base by an intervening proximal link, one of said distal links being connected to the mounted end of said arm and said proximal links coupled to said base linkage, said base linkage being fixed to said base;
   (c) a rotational joint carried by said arm support providing the operative end of the arm with a rotational degree of freedom about an arm rotational axis located at the mounted end of the arm, said arm rotational axis permitting displacement of the operative end of the arm in a direction out of said plane;

(d) a planar position sensor device carried by the base to sense the location of the operative end of the arm in said plane and provide planar sensor signals;

(e) an out-of-plane displacement sensor device positioned at the mounted end of the arm to sense the out-of-plane displacement of the operative end of the arm with respect to the base and provide out-of-plane sensor signals;

whereby the planar sensor signals and the out-of-plane sensor signals correspond to the location of the operative end of the arm in three dimensional space.

2. A sensing arm assembly as in claim 1, further comprising a biasing device for returning the operative end of the arm to a zero position within said plane in respect of an out-of-plane displacement in at least one direction.

3. A sensing arm assembly as in claim 2 wherein the biasing device provides a restoring force directing the operative end of the arm towards said zero position and said restoring force varies with the displacement of said operative end from the zero position.

4. A sensing arm assembly as in claim 2 wherein the biasing device is provided by an elastic element coupled to the arm at its mounted end by the base.

5. A sensing arm assembly as in claim 1 the arm comprises a sensing face surface carried at the mounted end of the arm and said out-of-plane displacement sensor device is positioned to sense the out-of-plane movement of the operative end of the arm by the reflection of light off of the sensing face surface.

6. A sensing arm assembly as in claim 1 said planar position sensor device comprises two rotational sensors carried by the base and each coupled to one of the proximal links of the five-bar linkage to sense the location of the arm in planar directions.

7. A sensing arm assembly as in claim 6 wherein said rotational sensors each have a rotation axis and said rotational axes coincide with each other.

8. A sensing arm assembly as in claim 1 further comprising a pair of torquing actuators coupled between the base and the respective proximal links of the 5-bar linkage.

9. A sensing arm assembly as in claim 1 further comprising a handle rotatably coupled to the arm at the operative end of the arm by a rotary joint.

10. A torquing actuator for applying two or more independent torquing forces to a corresponding even plurality of output arms, said device comprising:

(1) a frame having a central axis;

(2) one or more magnetic circuits formed by one or more magnets carried by the frame and positioned to provide in an adjacent, commonly connected air gap an even number of spatially separated reversing magnetic field regions; and (3) a corresponding even plurality of electrical coils matching in number the number of reversing magnetic field regions, respectively coupled to said plurality of output arms, said coils being supported within the frame for rotation about the central axis and each being positioned within the air gap to respectively intercept reversing magnetic field regions whereby, upon activation of said electrical coils when current is supplied to said electrical coils, the output arms may be caused to independently generate torque about the central axis.

11. A torquing device as in claim 10 further comprising a plurality of position sensors carried by the frame and positioned to sense the position of members corresponding and coupled to said electrical coils.

12. A hand controller comprising:

(a) a handle extending upwardly from a horizontal plane;

(b) a five-bar linkage positioned in parallel with the horizontal plane and having a base link at its base end, two distal links at its distal end and two proximal links positioned therebetween, said linkage being provide with two base end rotary joints at the base end of the linkage, each of said two base end rotary joints being provided with rotational sensors; and (c) an arm extending between the handle and the distal end of the five-bar linkage, the arm rotatably connected to the handle at a distal end of the arm by a rotary joint, wherein the five-bar linkage permits the handle to move in two planar degrees of freedom;

(d) a hinge device connected between one of the distal links of the five-bar linkage and the arm and permitting the distal end of the arm (and the handle to be displaced out of the horizontal plane; and (e) a vertical displacement sensor carried by said five-bar linkage for sensing the displacement of the handle in the vertical direction.

13. A hand controller as in claim 12 further comprising a switch mounted on the handle that may be actuated by a user to provide signals to a central control processor, the switch having an output dependent upon finger pressure-from the user on the switch, the control processor being programmed to respond to the pressure applied to the switch in conjunction with the displacement of the handle about the hinge device.

14. A hand controller as in claim 12 further comprising:

1) a plurality of actuators for actuating said proximal links by outputting forces;

2) a switch mounted on the handle that may be actuated by a user to provide signals to a central control processor, the switch having an output dependent upon finger pressure from the user on the switch;

the control processor being programmed to respond to the pressure applied to the switch in conjunction with the displacement of the handle about the hinge device.

15. A sensing arm assembly as in claim 9 further comprising a switch mounted on the handle that may be actuated by a user to provide signals to a central control processor, the switch having an output dependent on finger pressure from the user on the switch, the control processor being programmed to respond to the pressure applied to the switch in conjunction with the displacement of the handle in the rotational degree of freedom.

16. A sensing arm assembly as in claim 9 further comprising:

1) two actuators, each actuator coupled to one of the proximal links, where the actuators output forces to actuate said proximal links;

2) a switch mounted on the handle that may be actuated by a user to provide signals to a central control processor, the switch having an output dependent upon finger pressure from the user on the switch;

the control processor being programmed to respond to the pressure applied to the switch in conjunction with the displacement of the handle in the rotational degree of freedom.

17. A sensing arm assembly as in claim 9 wherein the five-bar linkage is positioned in parallel with a horizontal plane and wherein the handle extends out of the horizontal plane.

18. A sensing arm assembly as in claim 16 wherein force output from the actuators is reduced when less pressure is sensed on the switch, and wherein force output from the actuators is increased when greater pressure is sensed on the switch.

19. A hand controller as in claim 12 further comprising a biasing device for biasing the distal end of the arm to a position within the horizontal plane in at least one direction, wherein the biasing device provides a restoring force directing the distal end of the arm towards the position in the horizontal plane and the restoring force varies with the displacement of the distal end from the position in the horizontal plane.

20. A hand controller as in claim 12 further comprising a pair of torquing actuators coupled between the base links and the respective proximal links of the 5-bar linkage.

* * * * *